United States Patent [19]

Zuckerman et al.

[11] 4,335,034

[45] Jun. 15, 1982

[54] THERMOPLASTIC COMPOSITIONS AND AUTOMOTIVE CARPETING BACKED THEREWITH

[75] Inventors: Joseph L. Zuckerman, Livingston; John W. Bzik, North Haledon, both of N.J.

[73] Assignee: J. P. Stevens & Co., Inc., New York, N.Y.

[21] Appl. No.: 149,091

[22] Filed: May 12, 1980

Related U.S. Application Data

[62] Division of Ser. No. 970,693, Dec. 18, 1978, Pat. No. 4,242,395.

[51] Int. Cl.³ .................. C08K 3/24; C08K 3/26; C08K 5/01; C08L 9/00
[52] U.S. Cl. .................. 524/423; 525/222; 525/232; 525/241; 524/426; 524/427; 524/915; 524/518; 524/521; 524/523; 524/524
[58] Field of Search .......... 260/33.6 AQ, 42.32, 260/42.33, 37.8 M, 31.8 PQ, 18 PF, 23.5 A, 42.47, 42.40, 42.52; 525/222, 232, 241

[56] References Cited

U.S. PATENT DOCUMENTS

| | | | |
|---|---|---|---|
| 3,806,558 | 4/1974 | Fischer | 260/42.33 |
| 3,849,353 | 11/1974 | Taft et al. | 525/222 |
| 3,887,738 | 6/1975 | Taft et al. | 525/222 |
| 3,941,859 | 3/1976 | Batiuk et al. | 260/23.5 A |
| 3,957,919 | 5/1976 | Von Bodungen et al. | 260/42.33 |
| 4,012,547 | 3/1977 | Smedberg | 525/222 |
| 4,211,692 | 7/1980 | Barkis et al. | 525/222 |
| 4,219,453 | 8/1980 | Sakurai et al. | 260/42.13 |

*Primary Examiner*—Allan Lieberman
*Attorney, Agent, or Firm*—Michael T. Frimer

[57] ABSTRACT

Thermoplastic compositions are disclosed which are useful as backings for automotive carpets. The thermoplastic compositions contain a high filler content of at least 60 percent by weight, about 5 to 25 percent by weight of an ethylene homopolymer or copolymer, about 1 to 10 percent by weight of a non-vulcanized elastomeric resin and about 1 to 15 percent by weight of a plasticizer. Preferably a low viscosity precoat of polyethylene or ethylene/vinyl acetate copolymer is applied to the carpet prior to the application of the thermoplastic backing. The backed automotive carpet is moldable, withstands both high and low temperatures, possesses outstanding sound absorbing properties and can be produced economically.

6 Claims, No Drawings

THERMOPLASTIC COMPOSITIONS AND AUTOMOTIVE CARPETING BACKED THEREWITH

This is a division, of application Ser. No. 970,693 filed Dec. 18, 1978, now U.S. Pat. No. 4,242,395.

BACKGROUND OF THE INVENTION

1. Field of the Invention

This invention relates to backing tufted carpet with a novel thermoplastic composition to produce a composite product which has excellent sound absorbing characteristics and other properties useful in an automotive floor covering.

2. Prior Art

It is known to back size carpeting with thermoplastics containing ethylene/mono-unsaturated ester copolymers such as ethylene/vinyl ester or ethylene/alkyl acrylate copolymers. U.S. Pat. No. 3,645,949 of Crimi discloses applying to the back of carpeting a backing composition containing an ethylene/mono-unsaturated ester copolymer, and ethylene hydrocarbon polymer and optional additives such as wax and fillers. Other carpet backsizing compositions of this type are disclosed in U.S. Pat. No. 3,390,035 of Sands which discloses a backing composition containing ethylene/vinyl acetate copolymer, wax and various optional additives, and U.S. Pat. No. 3,583,936 of Stahl, which discloses a composition containing ethylene/vinyl ester, wax and a resin extender blend. U.S. Pat. No. 3,684,600 of Smedberg is directed to a backing system in which a precoat composition having an application viscosity of 2-2000 c.p.s. is applied prior to the main backing composition which has a higher application viscosity.

U.S. Pat. No. 3,745,054 of Smedberg relates to composition having a high filler content which is suitable for backsizing carpet. This composition comprises ethylene/vinyl ester copolymer, paraffin wax, microcrystalline wax, aliphatic thermoplastic hydrocarbon resin, dicyclopentadiene alkylation polymer, anti-oxidant and filler. Another carpet backsizing composition with a high filler content is U.S. Pat. No. 4,012,547 of Smedberg.

U.S. Pat. No. 3,982,051 of Taft et al. discloses a composition useful as a carpet backsizing which in addition to a copolymer of ethylene and an unsaturated ester such as ethylene/vinyl acetate, also contains polypropylene and a vulcanized rubber. U.S. Pat. No. 3,484,405 of Seto discloses adhesive compositions containing both rubber and ethylene/vinyl acetate but there is no indication that these particular compositions of this patent can be used as a carpet backing.

U.S. Pat. No. 3,645,948 of Stahl relates to backsizing compositions for carpets which are particularly useful where the backsized carpets are to be molded to a desired shape such as that of an automobile floor. The backsizing compositions contain 30 to 45 percent by weight of ethylene/vinyl ester copolymer and 55 to 70 percent by weight of a microcrystalline or Fischer-Tropsch wax.

As a means of decreasing the weight of automobiles, there have been recent efforts to prepare automotive carpets having a sound absorbing thermoplastic backing layer which eliminates the need for the sound absorbing materials previously located beneath the automotive carpets. In order to meet the requirements imposed by such use in an automotive carpet, the backing layer must: (1) Be moldable, including the ability to stretch during molding; (2) Be capable of locking carpet fibers into the carpet structure; (3) Withstand high temperature aging; (4) Have good low temperature cracking so that the carpet can be installed while cold; (5) Be capable of adhering to the material beneath the carpeting; (6) Have excellent sound absorbing properties, and (7) Be economical to produce. Additionally, it is preferred that the composition be readily admixed in an extruder.

One thermoplastic backing system for automotive carpets which has been developed utilizes a low viscosity ethylene/vinyl ester copolymer precoat followed by a heavier main coating consisting essentially of a higher viscosity ethylene/vinyl ester copolymer and filler. As a result of the stiffness of the main coating, there has been a problem of portions of the backed carpeting coming loose from the materials over which it is installed. This not only reduces the sound absorbing ability of the backed carpeting, but the loose carpeting rattles thereby contributing to the noise problem. Additionally, the main coating is relatively expensive and this has created an economic problem in view of the relatively thick coating which must be applied to obtain the desired sound absorbing characteristics.

SUMMARY OF THE INVENTION

The present invention provides a thermoplastic composition useful as a backing for automotive carpeting which is moldable, sound absorbing, odor free and capable of withstanding high temperature aging, has good low temperature cracking properties and adheres well to fibers in a carpet and automotive materials positioned beneath the carpet. Additionally, the composition is relatively soft so that it does not present any rattling problems and has a very high filler content which makes it relatively inexpensive.

The thermoplastic composition of this invention comprises: (a) About 5 to 25 (preferably 10 to 20 weight percent of an ethylene/monosaturated ester copolymer or polyethylene; (b) About 1 to 10 (preferably 3 to 8) weight percent of an elastomeric resin; (c) About 60 to 95 (preferably 65 to 80) weight percent of an inert mineral filler, and (d) About 1 to 15 (preferably 5 to 12) weight percent of a plasticizer. This composition is applied as a melt or laminate to the back of the tufted carpeting. Preferably a precoat composition having a lower application viscosity than the main thermoplastic composition is coated onto the back of the tufted carpeting prior to the application of the main thermoplastic composition.

DETAILED DESCRIPTION OF THE INVENTION

In accordance with the present invention, improved automotive carpeting is provided by applying thereto the thermoplastic composition described above. The backed automotive carpeting is then cut and molded to the desired shape.

The ethylene/mono-unsaturated ester copolymers which can be used in the thermoplastic compositions of this invention are prepared by polymerizing ethylene with one or more unsaturated esters. Copolymerizable mono-unsaturated esters include vinyl esters wherein the acid moiety contains 1–4 carbon atoms such as vinyl acetate, vinyl formate, vinyl propionate and vinyl butyrate and alkyl esters of acrylic acid and methacrylic acid wherein the alkyl group contains 1–10 carbon atoms such as methyl acrylate, ethyl acrylate, isopropyl acrylate, 2-ethylhexyl acrylate, hexyl acrylate, decyl acrylate, ethyl methacrylate, ect. These copolymers have a copolymerized ethylene content of about 70 to 88 (preferably about 75-85) weight percent and a copolymerized mono-unsaturated ester content of about 12-30 (preferably about 15-25) weight percent. The ethylene copolymers have melt indices as shown by ASTM-1238 of about 1-10, preferably about 1-3. Part or all of the ethylene copolymer can be replaced with polyethylene having a melt index within these ranges.

The elastomeric resins are added to the composition in a non-vulcanized state and preferably have a Mooney viscosity of about 20-90. Examples of suitable elastomers are styrene-butadiene rubbers, polybutylene, nitrile-butadiene rubbers, ethylenepropylene copolymers, terpolymers of ethylene, propylene and a minor amount of a third monomer such as a diene, and mixtures of these elastomers. The preferred elastomeric resins are ethylenepropylene copolymers and terpolymers containing about 20 to 75 mole percent of ethylene. The terpolymers preferably contain up to 5 percent of a diene such as 1,4-pentadiene, 2-methyl-1,4-pentadiene, 1,5-hexadiene, 1,4-hexadiene, 2-methyl-1,5-hexadiene, dicyclopentadiene, norbornadiene, methylenenorbornene and 1,5-cyclooctadiene.

Suitable inert fillers include, but are not limited to, calcium carbonate, barium sulfate, barium carbonate, calcium silicate, magnesium silicate, aluminum silicate and clay. Preferably the filler is calcium carbonate or barium sulfate.

In general, any of the oil plasticizers employed in rubber compounds can be used in the backing composition of this invention. Various hydrocarbon oils can be used with naphthenic and paraffinic oils being preferred. It is also possible to employ plasticizers commonly used with polyvinyl chloride. These plasticizers include phthalates, terephthalates and epoxydized oils. Plasticizers which are liquid at ambient temperatures are preferred.

In addition to the essential components described above, small amounts of conventional additives can be included in the composition. Examples of such additives are antioxidants, stabilizers, colorants, odorants, adhesion promoters and lubricants.

The tufted carpet used in the present invention is prepared in the usual way by stitching the base fabric with yarn in such a manner as to form on the top side of the base fabric a pile composed of erect loops of fiber bundles, i.e., tufts of yarn. It is customary to secure the base of the tufts by applying a binder such as sintered polyethylene-wax blends or extruded thermoplastics to the bottom side of the base fabric. As explained above, the layer of thermoplastic in our automotive carpet serves as a sound absorber in addition to binding the tufts of yarn and, thus, the layer of thermoplastic is substantially thicker than the adhesive layer of conventional carpeting. Preferably the layer of backing composition applied to the automotive carpeting of this invention is about 4-10 ozs./ft.$^2$. The base fabric of the tufted carpeting can be of any type known in the art and can be woven, e.g., woven jute, woven slit polypropylene film, burlap and the like or can be nonwoven fabric, e.g., needlepunched nonwoven polypropylene web.

It is preferred to apply a layer of precoat to the bottom of the base fabric prior to application of the thermoplastic backing composition. These precoats can be of the type disclosed in U.S. Pat. No. 3,684,600 and have a lower application viscosity than the backing composition. It has been found, however, excellent results can be obtained in the present invention when the precoat has an application viscosity substantially above the 2000 c.p.s. maximum of U.S. Pat. No. 3,684,600. Preferably the precoat is ethylene/vinyl acetate copolymer, ethylene/ethyl acrylate copolymer or polyethylene and has a maximum application viscosity of about 30,000 c.p.s. The precoat can be unfilled or can contain up to about 30 percent by weight of filler. The layer of precoat should be about 0.1 to 2 ozs./ft.$^2$.

Both the precoat and the backing composition are preferably applied to the carpet by extrusion. After application of the backing composition the carpet is cut to size and molded to the proper configuration for installation in an automobile.

The following example is given to further illustrate the invention.

EXAMPLE

A backing composition was prepared by blending the following formulation:

|  | Weight Percent |
|---|---|
| CaCO$_3$ | 70.0 |
| Naphthenic Process Oil* | 11.2 |
| Ethylene/ethyl acrylate copolymer** | 12.5 |
| Ethylene-propylene copolymer*** | 6.3 |
| Butylated hydroxy toluene stabilizer | 0.0025 |

*Carbon Structure-C(aromatic)-20%, C(Naphthenic)-38%, C(Paraffinic)-42%, Pour Point 20° F., Weight Loss (22 hours at 225° F.)-0.2%
**15% ethyl acrylate comonomer and melt index of 3.
***Specific Gravity 0.86, Mooney Viscosity (ML-8, 100° C.) of 36, Melt Index at 230° C. and 2160 gm. load ~ 1.5

A precoat (4 oz./sq.yd.) of polyethylene was extruded onto the back of tufted carpet at a temperature of 500° F. The polyethylene had a viscosity of about 15,000 c.p.s. at the extrustion temperature. After cooling the precoat, a layer (6 oz./ft.$^2$) of the above backing composition was extruded onto the precoat at a temperature of 350° F. After cooling, the backed carpet was cut to size and shaped by molding to produce an automotive carpet. The properties of this carpet sample were tested against the property specifications for automotive carpet presently required by the General Motors Corporation.

|  |  | Specification | Carpet Sample |
|---|---|---|---|
| Tensile lb./in.$^2$ | warp | 85 | 241 |
|  | fill | 75 | 172 |
| Trapezoid Tear lbs./in.$^2$ | warp | 10 min. | pass |
|  | fill | 10 min. | pass |
| Aged Tensile[1] | warp | 80% orig. | 231 |
|  | fill | 80% orig. | 217 |
| Tuftlock[2] |  | 3 lbs. min. | 4.3 lbs. |
| Cold Crack[3] |  | No Crack | No Crack |
| Wear Resistance[4] |  | 300,000 Cycles | pass |
| Pliability[5] | warp | 20–30 range | 26 |
|  | fill | 20–30 range | 22 |
| Bond and Degradation[6] of Backing Material |  | No deterioration | pass |

[1] Samples aged for 7 days at 93° C.
[2] Force required to remove tuft
[3] No puncturing or cracking with ladies' spike heel at −20° C.
[4] Wyzenbeek wear test 70 × 50 mesh stainless steel screen, 3 pound load, 4 pound tension
[5] Tinius Olsen Stiffness Tester (Model 88600) with 8 ounces additional weight at 20° C.
[6] Sample folded around a 76 mm. mandrel at −20° C., both without temperature aging and after 14 days of oven aging at 70° C. without breaking, cracking, stiffening or otherwise showing signs of deterioration.

It will be apparent that many modifications and variations can be effected without departing from the scope of the novel concepts of the present invention and the illustrative details disclosed are not to be construed as imposing undue limitations on the invention.

We claim:

1. A thermoplastic composition useful as a backing material for carpeting, said thermoplastic composition consisting of by weight:
   (a) About 5–25 percent of an ethylene containing polymer which is polyethylene or an ethylene/mono-unsaturated ester copolymer having a melt index of about 1 to 10,
   (b) About 1–10 percent of a non-vulcanized elastomer having a Mooney viscosity of about 20–90, which is a styrene-butadiene rubber, polybutylene, a nitrile-butadiene rubber, a copolymer of ethylene and propylene or a terpolymer of ethylene, propylene and a minor amount of a diene monomer or mixtures thereof, and the diene is selected from the class consisting of 1,4-pentadiene, 2-methyl-1, 4-pentadiene, 1,5-hexadiene, 1,4-hexadiene, 2-methyl-1, 5-hexadiene, dicyclopentadiene, norbornadiene, methylenenorbornene and 1,5-cyclooctadiene.
   (c) About 60–90 percent of an inert mineral filler, and
   (d) About 1–15 percent of a plasticizer for the ethylene containing polymer selected from the class consisting of hydrocarbon oils and polyvinyl chloride plasticizers.

2. A composition as claimed in claim 1 wherein said filler is calcium carbonate or barium sulfate.

3. A composition as claimed in claim 1 wherein said ethylene containing polymer is an ethylene/mono-unsaturated ester copolymer.

4. A composition as claimed in claim 3 in which the ethylene/mono-unsaturated ester copolymer is selected from the group consisting of ethylene/vinyl ester copolymer wherein the acid moiety of the vinyl ester contains 1–4 carbon atoms and alkyl esters of acrylic and methacrylic acid in which the alkyl group contains 1–10 carbon atoms.

5. A composition as claimed in claim 4 wherein said ethylene/mono-unsaturated ester copolymer contains 70–88 percent ethylene and 30–12 percent of a comonomer selected from the group consisting of ethyl acrylate and vinyl acetate.

6. The composition as claimed in claim 1 wherein said plasticizer is a hydrocarbon oil.

* * * * *

Notice of Adverse Decision in Interference

In Interference No. 101,146, involving Patent No. 4,335,034, J. L. Zuckerman, and J. W. Bzik, THERMOPLASTIC COMPOSITIONS AND AUTOMOTIVE CARPETING BACKED THEREWITH, final judgment adverse to the patentees was rendered Apr. 4, 1984, as to claims 1-6.

[*Official Gazette June 5, 1984.*]